(12) United States Patent
Yang et al.

(10) Patent No.: US 10,767,355 B2
(45) Date of Patent: Sep. 8, 2020

(54) WALL-MOUNTED SHOWER HEAD HOLDING STRUCTURE

(71) Applicant: Purity (Xiamen) Sanitary Ware Co., Ltd., Xiamen, Fujian (CN)

(72) Inventors: Xiwen Yang, Xiamen (CN); Jiayuan Huang, Xiamen (CN); Xingchuan Ling, Xiamen (CN); Guozhong Wu, Xiamen (CN); Weisheng Wu, Xiamen (CN); Jinlong Wu, Xiamen (CN)

(73) Assignee: PURITY (XIAMEN) SANITARY WARE CO., LTD., Xiamen, Fujian (CN)

( * ) Notice: Subject to any disclaimer, the term of this patent is extended or adjusted under 35 U.S.C. 154(b) by 0 days.

(21) Appl. No.: 16/059,043

(22) Filed: Aug. 9, 2018

(65) Prior Publication Data

US 2020/0048883 A1    Feb. 13, 2020

(51) Int. Cl.
*E03C 1/06*      (2006.01)
*F16B 47/00*    (2006.01)

(52) U.S. Cl.
CPC .............. *E03C 1/06* (2013.01); *F16B 47/006* (2013.01)

(58) Field of Classification Search
CPC .......... F16B 47/006; E03C 1/06; E03C 1/063; E03C 1/066
See application file for complete search history.

(56) References Cited

U.S. PATENT DOCUMENTS

| | | | | |
|---|---|---|---|---|
| 5,031,256 A * | 7/1991 | Mikiya | ................ | A61H 33/027 4/492 |
| 6,401,273 B1 * | 6/2002 | Fung | .................. | A61H 33/0091 4/541.4 |
| 6,415,461 B1 * | 7/2002 | Singer | ..................... | A47K 3/28 239/273 |
| 10,046,342 B2 * | 8/2018 | Zhang | ..................... | B05B 1/185 |
| 2006/0230520 A1 * | 10/2006 | Tsai | ......................... | E03C 1/06 4/567 |
| 2009/0000022 A1 * | 1/2009 | Phipps | .................. | E03C 1/0408 4/601 |
| 2009/0113616 A1 * | 5/2009 | Daly, Sr. | ............ | A46B 11/0058 4/606 |
| 2010/0038503 A1 * | 2/2010 | Chien | .................. | A47K 17/022 248/205.8 |
| 2011/0127395 A1 * | 6/2011 | Ostendarp | ............. | F16B 47/006 248/205.8 |
| 2013/0269793 A1 * | 10/2013 | Tsai | ........................ | E03C 1/066 137/343 |
| 2015/0033470 A1 * | 2/2015 | Sharratt | ................ | E03C 1/0408 4/695 |
| 2016/0001306 A1 * | 1/2016 | Anderson | ................. | B05B 1/18 239/268 |

(Continued)

*Primary Examiner* — J C Jacyna
(74) *Attorney, Agent, or Firm* — Leong C. Lei

(57) ABSTRACT

A wall-mounted shower head holding structure includes a suction cup assembly capable of holding a shower head. The suction cup assembly includes a suction cup body and a retractable mechanism. The suction cup body can be retractably held to a front end of a wall-mounted main body through the retractable mechanism. When in use, the shower head is attached to and held at the front end of the suction cup assembly. It is quite convenient for use, and does not affect the use of the shower head.

4 Claims, 10 Drawing Sheets

(56) References Cited

U.S. PATENT DOCUMENTS

2016/0038955 A1* 2/2016 Cohen .................. E03C 1/0408
    239/282
2017/0172358 A1* 6/2017 Sainio ................... A47K 7/024
2018/0100295 A1* 4/2018 Olsen ....................... E03C 1/06

* cited by examiner

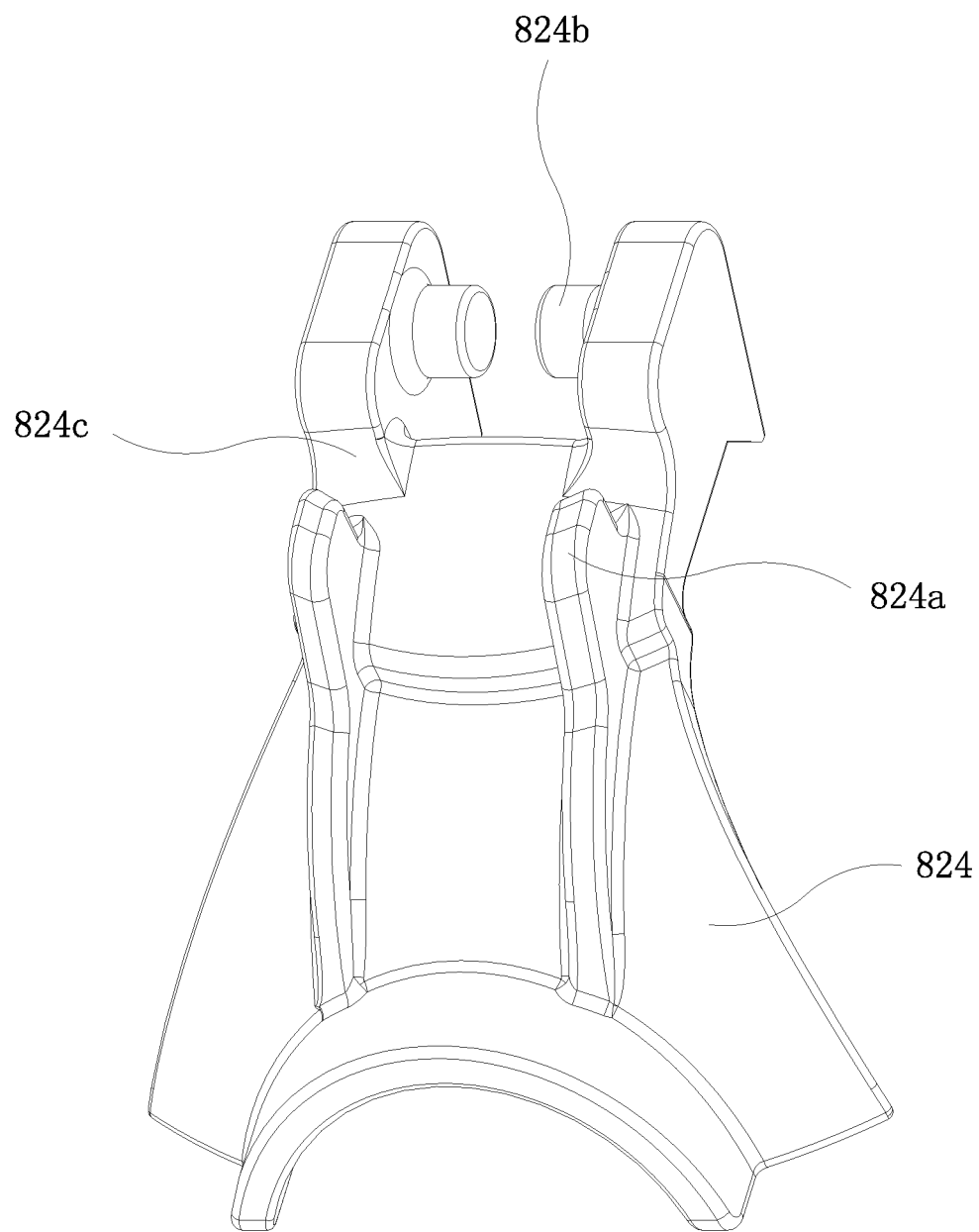
F I G. 7

WALL-MOUNTED SHOWER HEAD HOLDING STRUCTURE

BACKGROUND OF THE INVENTION

1. Field of the Invention

The present invention relates to a bathroom accessory, and more particularly to a wall-mounted shower head holding structure.

2. Description of the Prior Art

As shown in FIG. 1 and FIG. 2, a conventional wall-mounted structure comprises a wall-mounted main body 1, a ball joint nut 2, a ball joint 3, a fixing ring 4, a spacer 5, and a gasket 6. The ball joint 3 is connected to the wall-mounted main body 1 through the ball joint nut 2. The wall-mounted main body 1 is communicated with a water outlet on the wall through the ball joint 3. The water flows from the ball joint 3 to the wall-mounted main body 1, and then flows out of the wall-mounted main body 1 into a hose. The wall-mounted structure further includes a socket 7 fixed to the wall-mounted main body 1 as a shower head holding structure. The socket 7 has a groove 71 to mate with a hose connector of the shower head, so that the shower head can be held on the wall-mounted structure. The shower head holding structure can only be used for general hose connectors, not suitable for some special connectors (such as cylindrical or hexagonal connectors). The versatility is not good. There is only one position for holding the shower head (i.e., the hose connector). It is inconvenient for users with different use requirements, such as different heights.

Nowadays, there are some products on the market for improving the convenience of holding a shower head. For example, Chinese Utility Model Registration No. 201120229346.0 discloses a suction cup shower head. The main body of the shower head is provided with a suction cup to realize a flexible holding function for the shower head. Obviously, the structure can hold the shower head conveniently. But, the suction cup is mounted to the shower head to become one-piece, which may cause an obstacle when using the shower head and affect the beauty of the shower head. After the shower head is held by the suction cup, it is more laborious to remove the shower head due to the characteristics of the suction cup.

Accordingly, the inventor of the present invention has devoted himself based on his many years of practical experiences to solve these problems.

SUMMARY OF THE INVENTION

The primary object of the present invention is to provide a wall-mounted shower head holding structure for holding a shower head to facilitate the use of the shower head.

In order to achieve the aforesaid object, the wall-mounted shower head holding structure of the present invention comprises a suction cup assembly capable of holding a shower head. The suction cup assembly is mounted to a front end of a wall-mounted main body.

Preferably, the suction cup assembly comprises a suction cup body and a retractable mechanism. The suction cup body can be retractably held at the front end of the wall-mounted main body through the retractable mechanism.

Furthermore, the suction cup assembly further includes a rubber pad and a suction cup spring. The retractable mechanism is composed of a spring, a fixing seat, a fixing nut and a switch handle. The front end of the wall-mounted main body is formed with a sliding sleeve. The fixing seat is movable back and forth and is disposed in the sliding sleeve. The fixing nut is threadedly connected to a front end of the sliding sleeve. The spring is disposed in the sliding sleeve. One end of the spring abuts against a rear end of the fixing seat, and another other of the spring abuts against a rear end of an inner wall of the sliding sleeve. A back of the suction cup body is formed with a connecting sleeve. The connecting sleeve is movable back and forth to be inserted through the fixing nut and fitted onto the fixing seat.

The suction cup body has a central through hole passing through the front and the back of the suction cup body. The rubber pad hermetically covers the front of the suction cup body. A connecting rod is connected to a back of the rubber pad. The connecting rod is inserted through the through hole. The connecting rod is further hinged to one end of a switch handle located on the back of the suction cup body. The suction cup spring is disposed between the rubber pad and the suction cup body. The suction cup spring is sleeved on the connecting rod. When the rubber pad is pushed backward by the shower head, the rubber pad, the connecting rod, the switch handle, the suction cup body and the connecting sleeve are simultaneously moved backward. The connecting sleeve pushes the fixing seat to slide backward in the sliding sleeve so that the spring in the sliding sleeve is compressed to achieve retraction of the suction cup assembly.

A back of the switch handle is formed with a raised portion having a curved surface corresponding to a front end of the fixing nut. When the switch handle is moved backward until the raised portion is pressed against the front end of the fixing nut, the switch handle pivots about its hinge point with the connecting rod by means of a reaction force of the front end of the fixing nut. The switch handle simultaneously drives the connecting rod to move backward a certain distance to drive the connecting rod to pull the rubber pad to be recessed in the suction cup body so that the shower head can be attached to and held on the suction cup assembly, and the raised portion is engaged with the front end of the fixing nut, enabling the suction cup assembly to be maintained in a retracted state.

Preferably, the suction cup assembly further includes a C-shaped buckle. A tail portion of the pull rod is formed with a groove. The C-shaped buckle is inserted into the groove of the tail portion of the pull rod to restrict the connecting rod from coming out of the through hole.

Preferably, a limiting ring is formed in a middle portion of the fixing nut. The limiting ring is configured to restrict the fixing seat from slipping out of the sliding sleeve.

Preferably, the end of the switch handle is formed with a hinge shaft. The connecting rod has a hinge hole corresponding to the hinge shaft.

With the above solution, when in use, the shower head is attached to and held at the front end of the suction cup assembly. It is quite convenient for use, and does not affect the use of the shower head.

BRIEF DESCRIPTION OF THE DRAWINGS

FIG. 7 is a perspective view of the switch handle of the present invention;

DETAILED DESCRIPTION OF THE PREFERRED EMBODIMENTS

Figure 1:
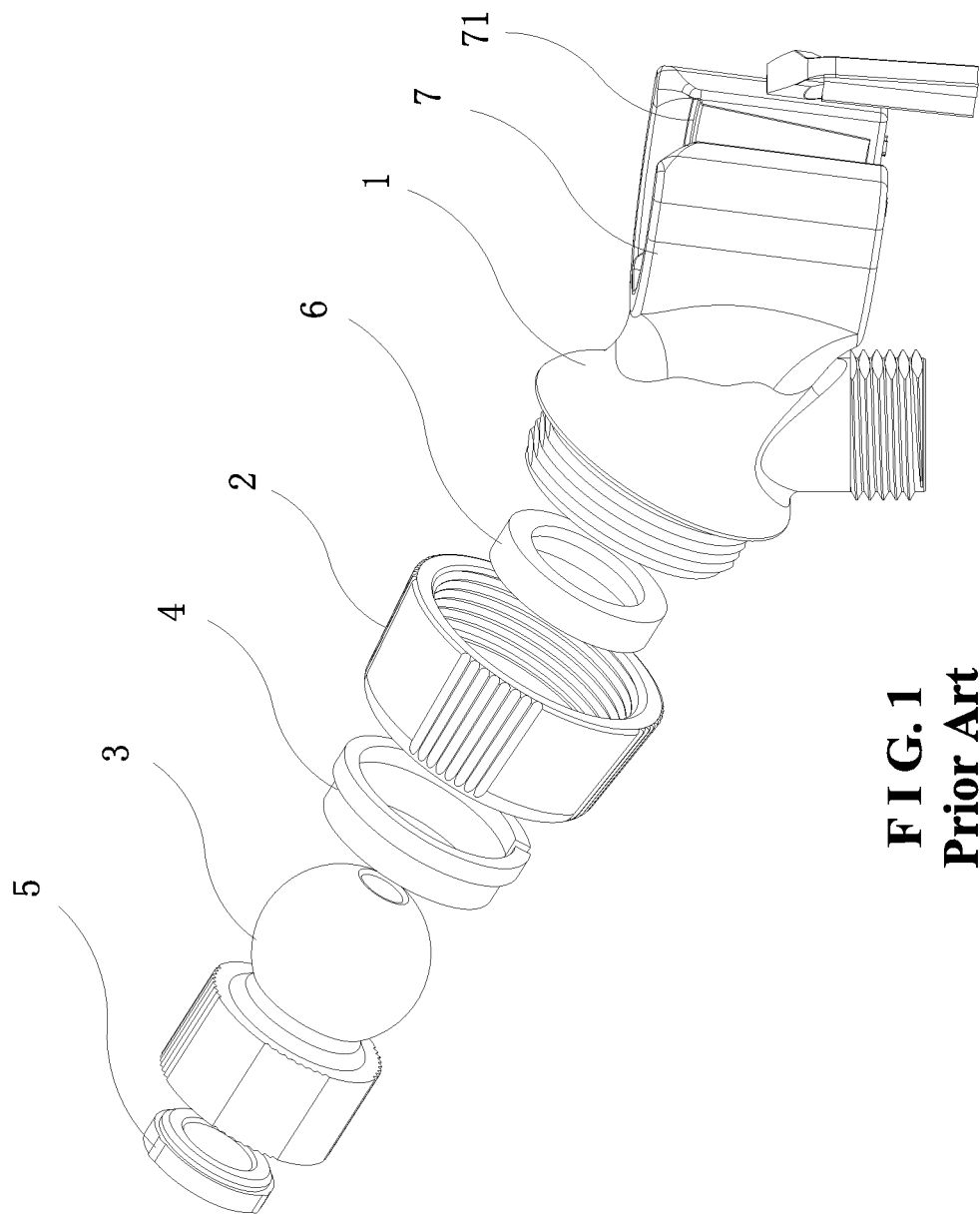
FIG. 1 is an exploded view of a conventional wall-mounted shower head holding structure.
Figure 2:
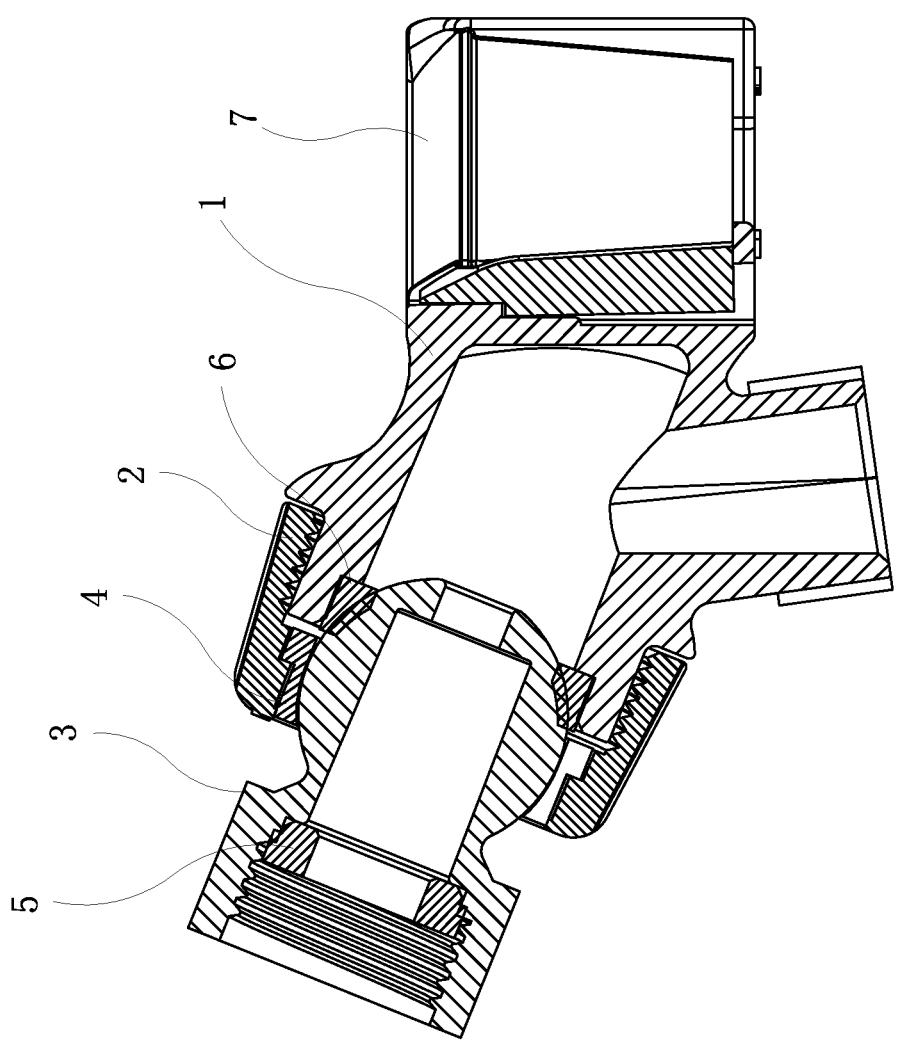
FIG. 2 is a sectional view of the conventional wall-mounted shower head holding structure.
Figure 3:
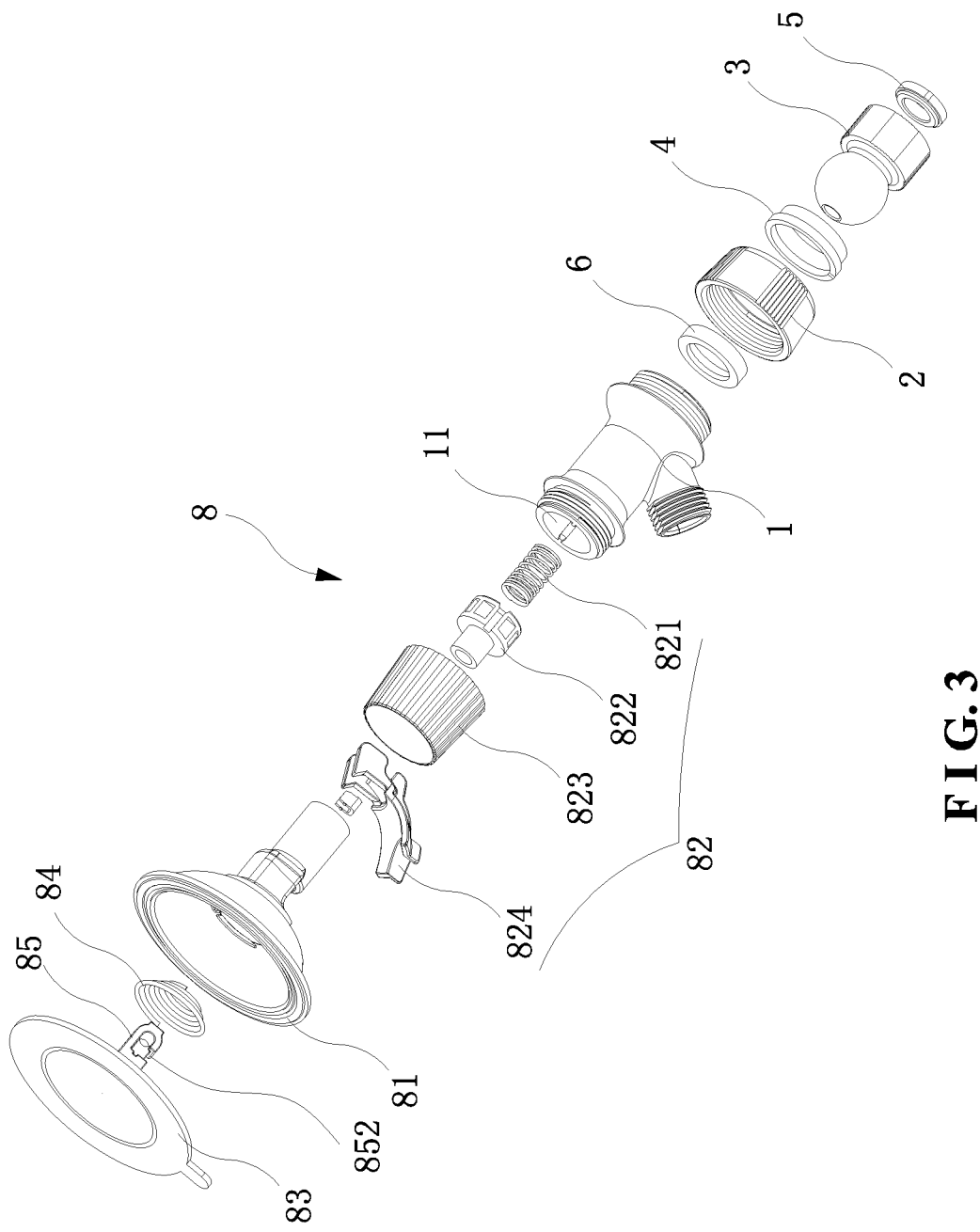
FIG. 3 is an exploded view of the present invention.
Figure 4:
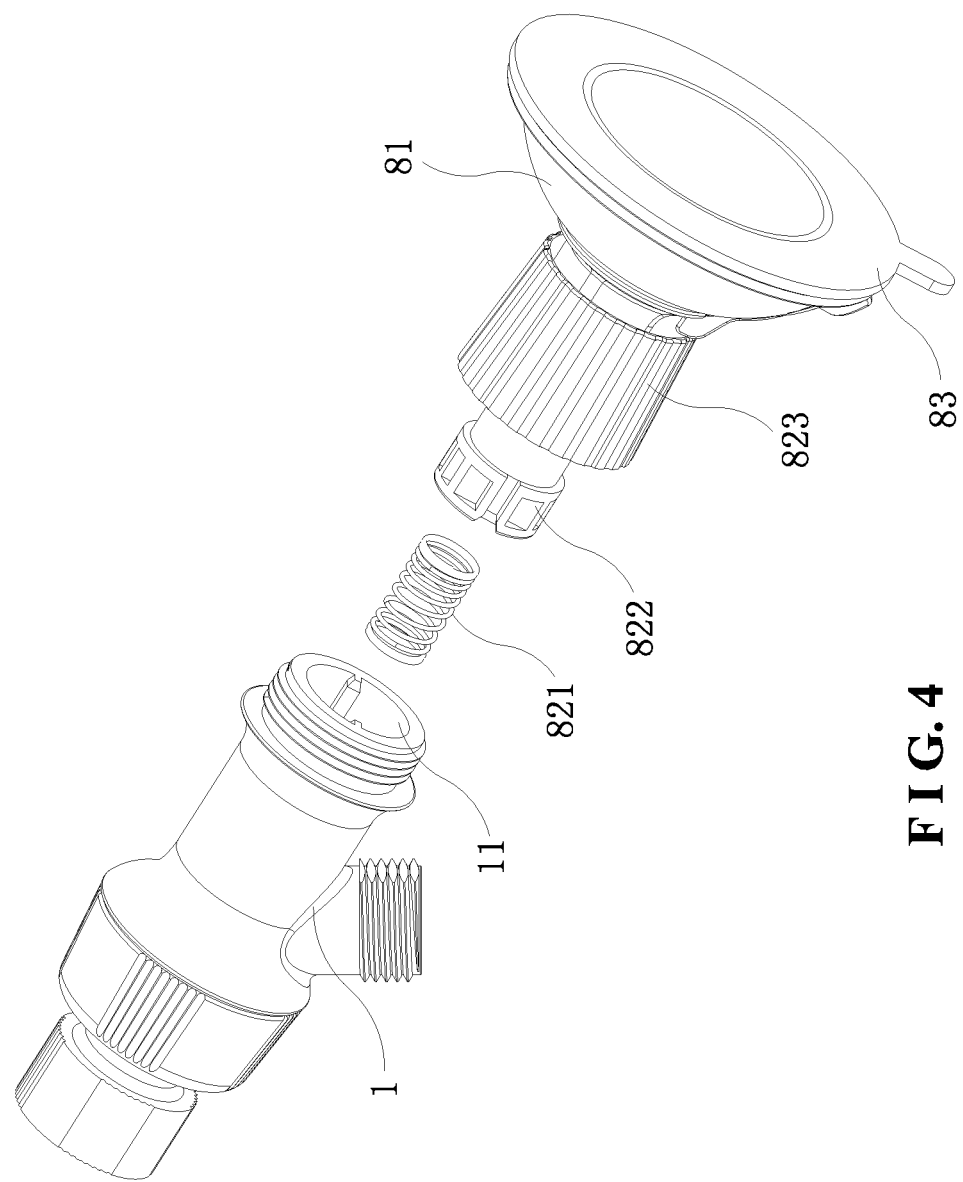
FIG. 4 is an exploded view of the suction cup assembly and the wall-mounted main body of the present invention.
Figure 5:
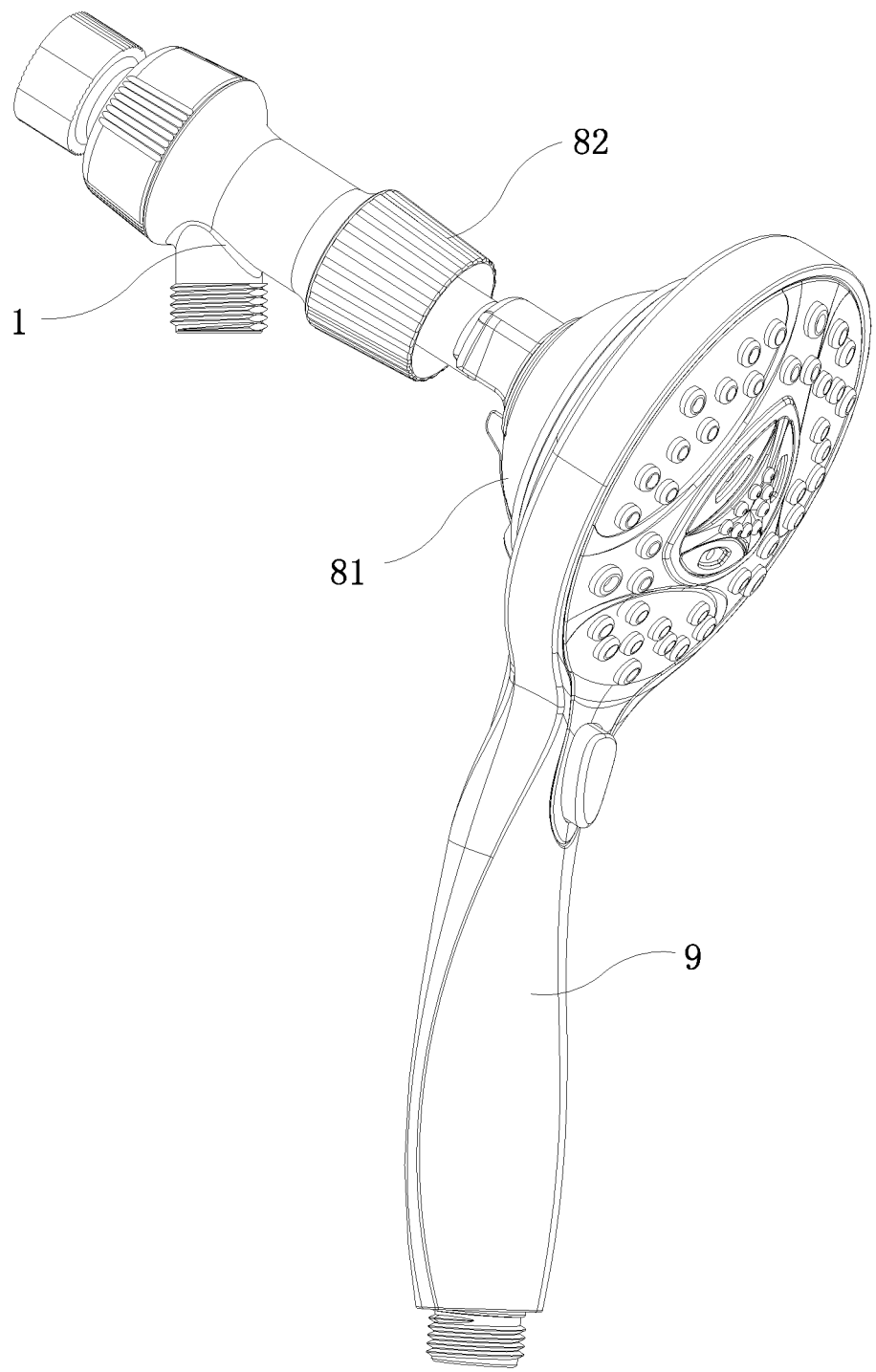
FIG. 5 is a perspective view of the present invention.
Figure 6:
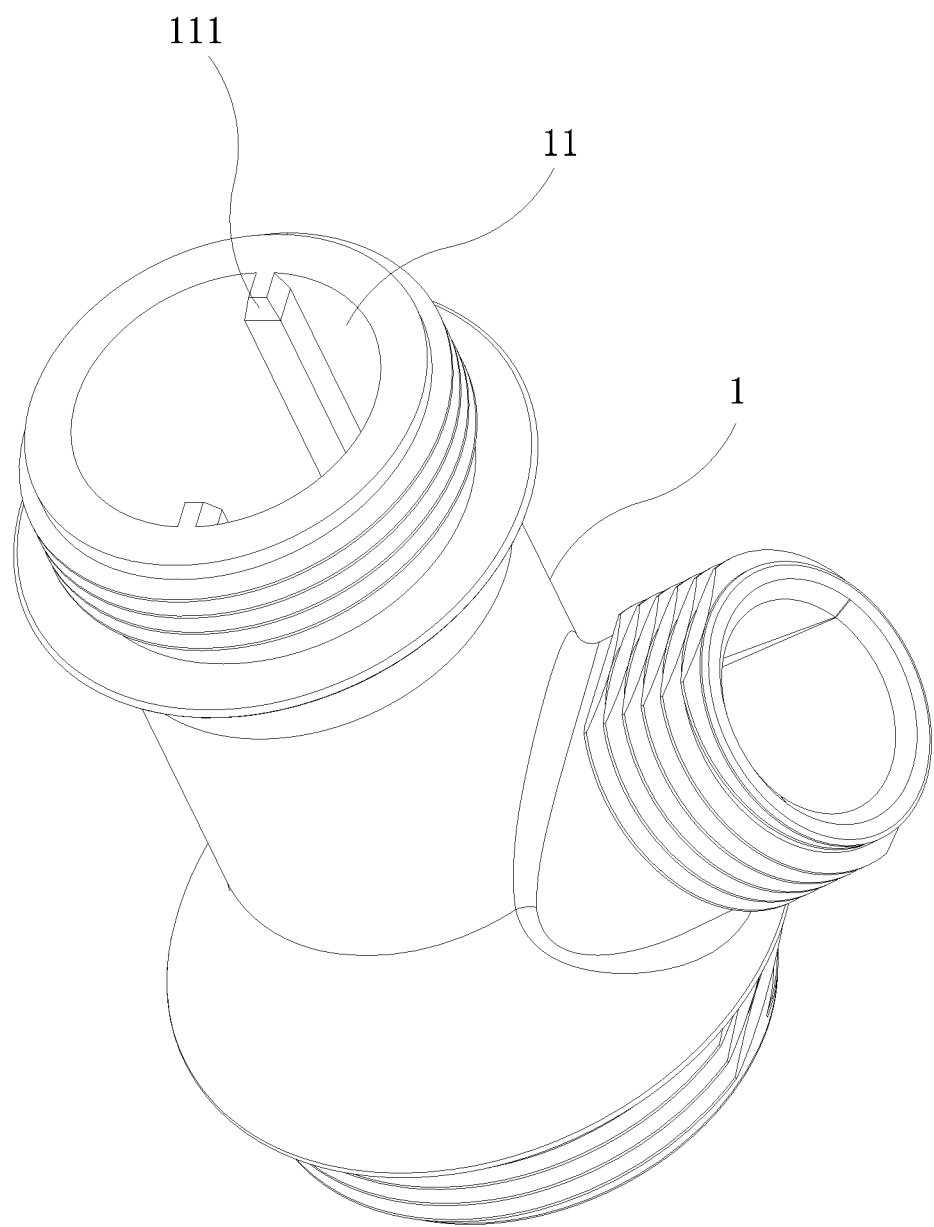
FIG. 6 is a perspective view of the wall-mounted main body of the present invention.
Figure 8:
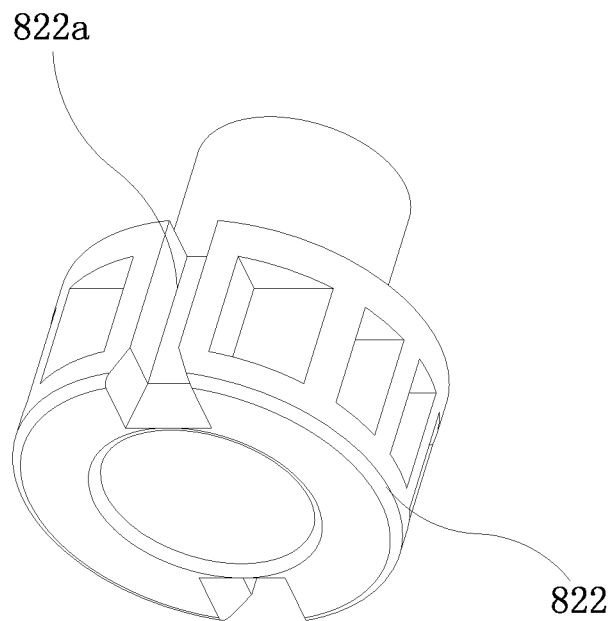
FIG. 8 is a perspective view of the fixing seat of the present invention.
Figure 9:
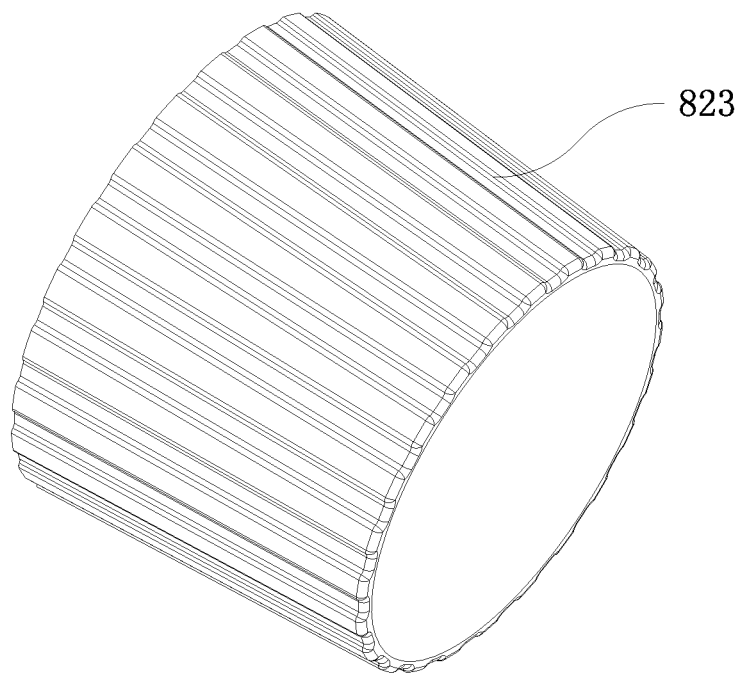
FIG. 9 is a perspective view of the fixing nut of the present invention.

Embodiments of the present invention will now be described, by way of example only, with reference to the accompanying drawings.

As shown in FIGS. 3-9, the present invention discloses a wall-mounted shower head holding structure. The structure comprises a suction cup assembly 8 capable of holding a shower head. The suction cup assembly 8 is mounted to a front end of a wall-mounted main body 1 and opposite to an external fixing surface such that suction cup assembly 8 that is mounted to a front end of the wall-mounted main body 1 is opposite to a back side of the wall-mounted main body 1 and is distant from the external fixing surface. The suction cup assembly 8 comprises a suction cup body 81 and a retractable mechanism 82. The suction cup body 81 can be retractably held at the front end of the wall-mounted main body 1 through the retractable mechanism 82.

In this embodiment, the suction cup assembly 8 further includes a rubber pad 83 and a suction cup spring 84. The retractable mechanism 82 is composed of a spring 821, a fixing seat 822, a fixing nut 823, and a switch handle 824. The front end of the wall-mounted main body 1 is formed with a sliding sleeve 11. The fixing seat 822 is movable back and forth and is disposed in the sliding sleeve 11. The fixing nut 823 is threadedly connected to a front end of the sliding sleeve 11. The spring 821 is disposed in the sliding sleeve 1. One end of the spring 821 abuts against a rear end of the fixing seat 822, and another other of the spring 821 abuts against a rear end of an inner wall of the sliding sleeve 11. The back of the suction cup body 81 is formed with a connecting sleeve 811. The connecting sleeve 811 is movable back and forth to be inserted through the fixing nut 823 and fitted onto the fixing seat 822.

The suction cup body 81 has a central through hole 812 passing through the front and the back of the suction cup body 81. The rubber pad 83 hermetically covers the front of the suction cup body 81. A connecting rod 85 is connected to the back of the rubber pad 83. The connecting rod 85 is inserted through the through hole 812. The connecting rod 85 is further hinged to one end of a switch handle 824. The switch handle 824 is located on the back of the suction cup body 81. The suction cup spring 84 is disposed between the rubber pad 83 and the suction cup body 81. The suction cup spring 84 is sleeved on the connecting rod 85. When the rubber pad 83 is pushed backward by the shower head, the rubber pad 83, the connecting rod 85, the switch handle 824, the suction cup body 81 and the connecting sleeve 811 are simultaneously moved backward. The connecting sleeve 811 pushes the fixing seat 822 to slide backward in the sliding sleeve 11 so that the spring 821 in the sliding sleeve 11 is compressed to achieve the retraction of the suction cup assembly 8.

The back of the switch handle 824 is formed with a raised portion 824a having a curved surface corresponding to a front end of the fixing nut 823. When the switch handle 824 is moved backward until the raised portion 824a is pressed against the front end of the fixing nut 823, the switch handle 824 will pivot about its hinge point with the connecting rod 85 by means of the reaction force of the front end of the fixing nut 823. The switch handle 824 simultaneously drives the connecting rod 85 to move backward a certain distance to drive the connecting rod 85 to pull the rubber pad 83 to be recessed in the suction cup body 81. The suction cup spring 84 sleeved on the connecting rod is compressed, so that the shower head can be attached to and held on the suction cup assembly 8. At this time, the curved raised portion 824a is engaged with the front end of the fixing nut 823, enabling the suction cup assembly 8 to be maintained in a retracted state.

Figure 10:
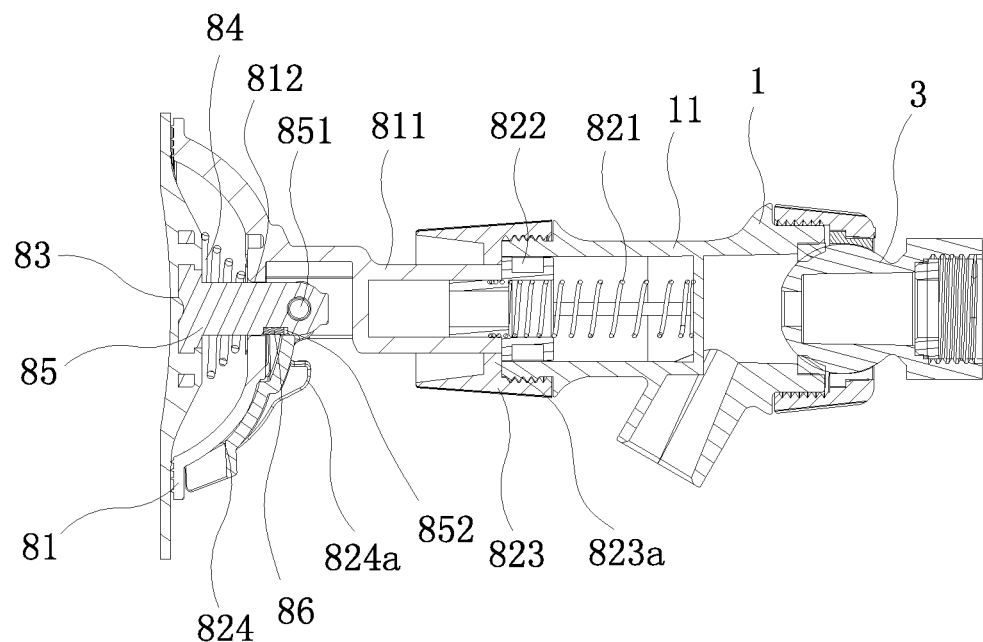
FIGS. 10-13 are cross-sectional views of various steps from the initial stage to the completion of holding the shower head when the present invention is used to hold the shower head.
Figure 11:
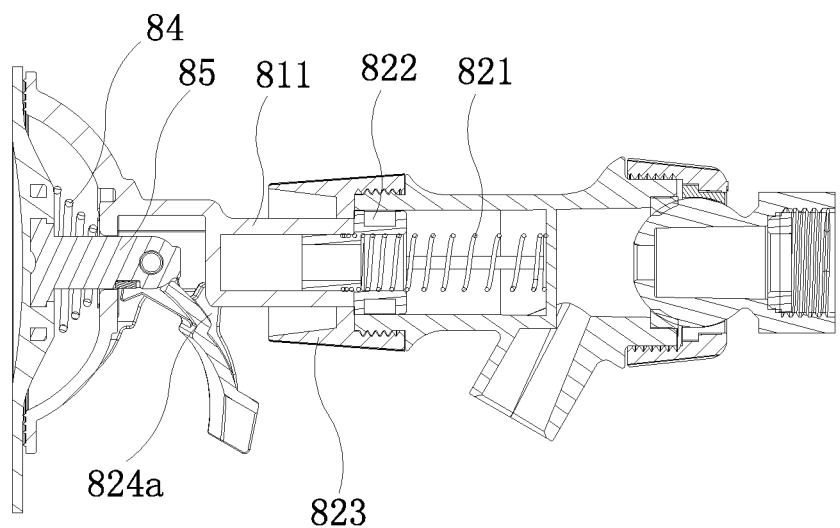
Figure 12:
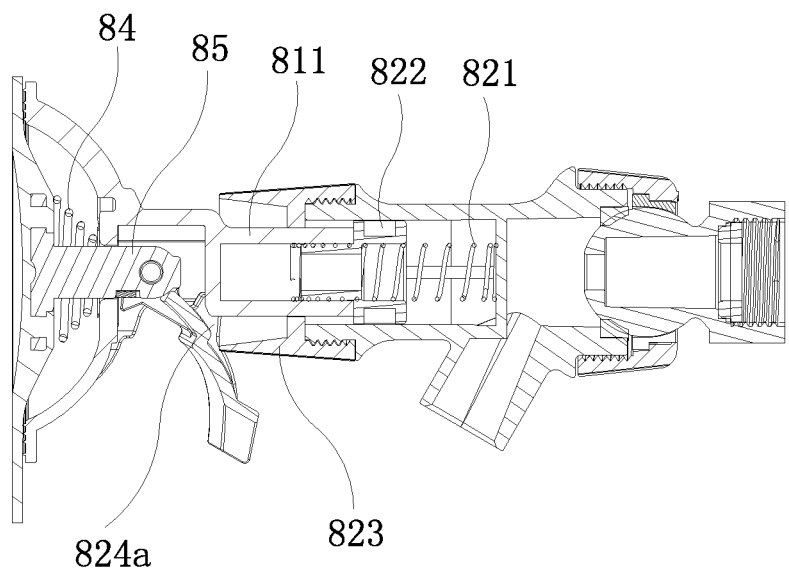
Figure 13:
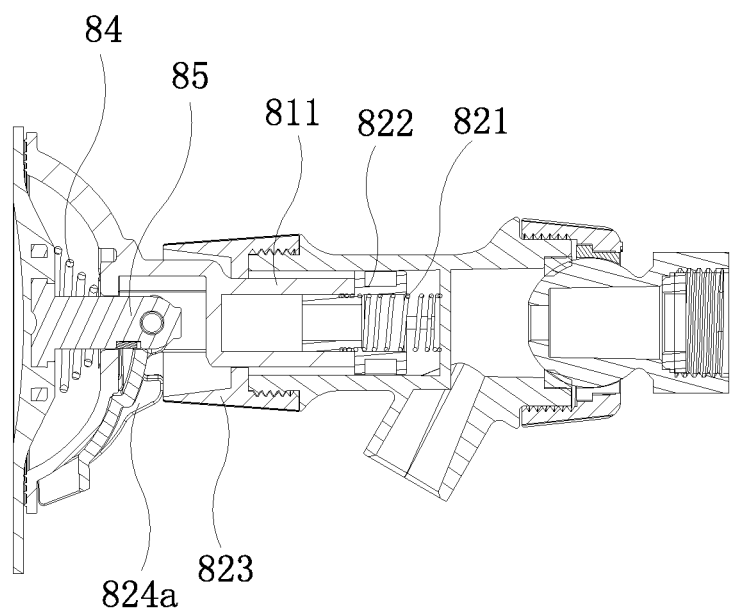

FIG. 10 is a schematic view of the shower head holding structure in an initial state. FIG. 11 is a schematic view of the shower head holding structure when in use. The rubber pad 83 and the suction cup body 81 are pressed backward by the shower head 9, so that the whole suction cup assembly 8 is moved backward, and the retractable mechanism 82 is retracted. The retractable mechanism 82 drives the suction cup assembly 81 to be retracted backward. In the process, the switch handle 824 is also moved backward. Referring to FIG. 12, when the raised portion 824a is moved to hold against the front end of the fixing nut 823, the switch handle 824 will pivot about its hinge point with the connecting rod 85 by means of the reaction force of the front end of the fixing nut 823. The switch handle 824 simultaneously drives the connecting rod 85 to move backward a certain distance to drive the connecting rod 85 to pull the rubber pad 83 to be recessed in the suction cup body 81, so that the shower head can be attached to and held on the suction cup assembly 8.

If the user wants to disengage the shower head from the suction cup assembly 8, it is only required to push the switch handle 824 to pivot about its hinge point to disengage the switch handle 824 from the front end of the fixing nut 823. The retractable mechanism 82 and the suction cup assembly 81 are moved forward by the restoring force of the spring 821 to be in an extendable state. At the same time, the connecting rod 85 is moved forward, and the suction cup spring 84 pushes the rubber pad 83 forward.

Furthermore, the suction cup assembly 8 further includes a C-shaped buckle 86. A tail portion of the pull rod 85 is formed with a groove 852. The C-shaped buckle 86 is inserted into the groove 852 of the tail portion of the pull rod 85 to restrict the connecting rod 85 from coming out of the through hole 812.

Furthermore, a limiting ring 823a is formed in the middle of the fixing nut 823. The limiting ring 823a is configured to restrict the fixing seat 822 from slipping out of the sliding sleeve 11.

Furthermore, one end of the switch handle 824 is formed with a hinge shaft 824b. The connecting rod 85 has a hinge hole 851 corresponding to the hinge shaft 824b.

The features of the present invention are described below.

1. Simply press the shower head against the suction cup assembly to hold the shower head. Simply move the switch handle to disengage the shower head from the suction cup assembly. The operation is convenient.

2. The shower head is held by pressing the suction cup assembly, without occupying the space used for other items.

3. There is no need to modify the structure of the shower head itself for holding the shower head. The cost is low. It does not affect the use of the shower head.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A wall-mounted shower head holding structure, comprising a suction cup assembly that is operable to releasably hold a shower head, the suction cup assembly being mounted to a front end of a wall-mounted main body and opposite to a back side of the wall-mounted main body that is adapted to mount to an external fixing surface such that the suction cup assembly that is mounted to the front end of the wall-mounted main body is opposite to the back side of the wall-mounted main body and is distant from the external fixing surface;

wherein the suction cup assembly comprises a suction cup body and a retractable mechanism, and the suction cup body is retractably held at the front end of the wall-mounted main body through the retractable mechanism; and wherein the suction cup assembly further includes a rubber pad and a suction cup spring, and the retractable mechanism comprises a retraction spring, a fixing seat, a fixing nut and a switch handle; the front end of the wall-mounted main body is formed with a sliding sleeve, the fixing seat being movable back and forth and disposed in the sliding sleeve, and the fixing nut is threadedly connected to a front end of the sliding sleeve; the retraction spring is disposed in the sliding sleeve, such that one end of the retraction spring abuts against a rear end of the fixing seat, and an opposite end of the retraction spring abuts against a rear end of an inner wall of the sliding sleeve; a back of the suction cup body is formed with a connecting sleeve, the connecting sleeve being movable back and forth and insertable through the fixing nut and fitted onto the fixing seat;

the suction cup body has a central through hole extending through a front and the back of the suction cup body, the rubber pad hermetically covering the front of the suction cup body, a connecting rod being connected to a back of the rubber pad, the connecting rod being inserted through the through hole, the connecting rod being further hinged to one end of a switch handle located on the back of the suction cup body, the suction cup spring being disposed between the rubber pad and the suction cup body, the suction cup spring being sleeved on the connecting rod, wherein when the rubber pad is pushed backward by the shower head, the rubber pad, the connecting rod, the switch handle, the suction cup body and the connecting sleeve are simultaneously moved backward, and the connecting sleeve pushes the fixing seat to slide backward in the sliding sleeve so that the retraction spring in the sliding sleeve is compressed to achieve retraction of the suction cup assembly; and a back of the switch handle is formed with a raised portion having a curved surface corresponding to a front end of the fixing nut, wherein when the switch handle is moved backward such that the raised portion is pressed against the front end of the fixing nut, the switch handle pivots about a hinge point with the connecting rod by means of a reaction force of the front end of the fixing nut, and the switch handle simultaneously drives the connecting rod to move backward a certain distance to drive the connecting rod to pull the rubber pad to be recessed in the suction cup body so that the shower head is attached to and held on the suction cup assembly, and the raised portion is engaged with the front end of the fixing nut, enabling the suction cup assembly to be maintained in a retracted state.

2. The wall-mounted shower head holding structure as claimed in claim 1, wherein the suction cup assembly further includes a C-shaped buckle, wherein a tail portion of the pull rod is formed with a groove, and the C-shaped buckle is inserted into the groove of the tail portion of the pull rod to restrict the connecting rod from coining out of the through hole.

3. The wall-mounted shower head holding structure as claimed in claim 1, wherein a limiting ring is formed in a middle portion of the fixing nut, and the limiting ring is configured to restrict the fixing seat from slipping out of the sliding sleeve.

4. The wall-mounted shower head holding structure as claimed in claim 1, wherein the end of the switch handle is formed with a hinge shaft, and the connecting rod has a hinge hole corresponding to the hinge shaft.

* * * * *